United States Patent Office 2,838,570
Patented June 10, 1958

2,838,570

PROCESS OF PRODUCING PURE HALOGENO METHYL (p-HYDROXY PHENYL) KETONES

Ludwig Winterhalder, Konstanz (Bodensee), Germany, assignor to Byk-Gulden Lomberg Chemische Fabrik G. m. b. H., a corporation of Germany No Drawing. Application March 16, 1955
Serial No. 494,819

Claims priority, application Germany March 26, 1954

13 Claims. (Cl. 260—592)

The present invention relates to a process for separating halogen methyl (4-hydroxyphenyl) ketones having the general formula

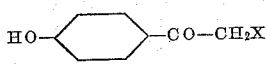

wherein X designates chlorine, bromine or iodine, from a mixture containing said ketones together with the corresponding (2-hydroxyphenyl) ketone namely

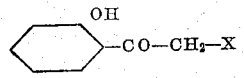

X designating the same as above, and undesired impurities.

As is known, the condensation of phenol or anisole and α-halogen acetyl halogenides in the presence of Friedel-Crafts catalysts, such as aluminum, chloride, boron fluoride and the like, results in mixtures which contain, in addition to the desired halogen methyl (4-hydroxyphenyl) ketones, also varying amounts of the corresponding 2-hydroxy compounds and sometimes unsubstituted phenol.

Fries and Pfaffendorf, Ber. 43, 215, and v. Auwers, Ber. 61, 419, propose to separate the 4-hydroxy compounds from the other components of the above mixture by water vapor distillation in which the 4-hydroxy compounds remain as a residue and may be crystallized through cooling. This process, however, is relatively complicated, time-consuming and expensive because the 2-hydroxy compounds have little volatility in water vapor.

It is the principal object of the present invention to provide a simple and economical process for obtaining pure halogen methyl (4-hydroxyphenyl) ketones from mixtures containing such ketones together with undesired impurities, that means one object is the separation of the 4-hydroxy compounds from the 2-hydroxy compounds.

In accordance with this invention, the desired 4-hydroxy compounds are separated from the 2-hydroxy compounds and any phenol which may be present in the mixture by adding to the mixture a halogenated low aliphatic hydrocarbon having 1-4 carbon atoms. The 4-hydroxy compounds, such as the corresponding ω-bromine, and ω-chlorine and ω-iodine compounds, are practically insoluble in these hydrocarbons while the impurities, particularly the 2-hydroxy compounds are easily dissolved therein. The p-hydroxy compound crystallizes in general already at room temperature. Using most of the above mentioned solvents, especially those having 1 to 2 carbon atoms, it is advisable for completion of the crystallization to proceed below room temperature, for example at 0°–15° C. When using the solvents having 3 and 4 carbon atoms cooling is generally not required. This marked difference in solubility of isomeric compounds is surprising and could not be foreseen.

Preferred halogenated low aliphatic hydrocarbons include 1,1,2,2-tetrachlorethane, dichlorethylene, dibromethane, trichlorethylene, tetrachlormethane, chloroform, methylene bromide, ethylene bromide, isopropyl bromide, propylene chloride, 1,2,3-trichloropropane, 2,3-dibromobutane, 1,1,2,2-tetrachlorobutane and the like.

The undissolved 4-hydroxy compounds may be easily separated from the mixture by filtration, particularly at low temperatures in the range of 0°–20° C., preferably 0°–5° C., while the dissolved 2-hydroxy compounds may be obtained from the mother liquid by precipitation with unsubstituted aliphatic hydrocarbons, such as for instance petroleum ether or pentane, or, preferably, by distilling off the solvent and crystallization of the residue with petroleum ether, a low alcohol or the like. Further purification of the 4-hydroxy compounds may be obtained by recrystallization with the above named solvents. The process may be applied to mixtures if isomeric halogen methyl-(hydroxyphenyl)-ketones which e. g. are formed when reacting phenol or phenol derivatives especially anisole, with halogenacetyl halogenides. Naturally the process may also be applied to isomeric mixtures which are obtained by halogenation of mixtures of o- and p-oxyacetophenones viz. their acyl derivatives and if desired subsequent saponification.

It may often be advantageous to effect the condensation reaction itself in the presence of one of the above halogenated low aliphatic hydrocarbons, for instance tetrachloroethane, rather than proceed with the conventional condensation process and then separate the 4-hydroxy compounds by the addition of the halogenated hydrocarbons. In this case, it will merely be necessary to eliminate the condensation catalyst in conventional manner, for instance by washing with an acid.

The process of this invention will be illustrated in the following examples.

Example I 100 g. of a mixture containing approximately equal amounts of o- and p-hydroxy-ω-chloroacetophenone and traces of phenol were treated with 250 g. tetrachloromethane at a temperature of about 30–40° C. and then cooled to 5° C. under agitation. After a few minutes practically pure p-hydroxy-ω-chloroacetophenone begins to crystallize out in substantially theoretical yield, having a melting point of 147° C. The crystallization is completed after two hours. After filtration of the p-compound, concentration of the tetrachloromethane of the filtrate about 80% of the added solvent being distilled off, and cooling, the o-compound was also crystallized. This o-compound may be purified by recrystallization with alcohol.

The above process was repeated with identical results by substituting chloroform, trichlorethylene, methylene dichloride, isopropyl chloride or ethylene bromide for tetrachloromethane.

Example II 40 g. anisole, 200 ccm. tetrachloroethane, 100 g. anhydrous aluminium chloride and 44 g. chloroacetylchloride were heated for 2–3 hours in a round bottom flask fitted with a condenser on a boiling water bath. The heated mixture was slowly poured under constant agitation into about 500 ccm. ice water where p-hydroxy-ω-chloroacetophenone crystallized from the solvent layer in light grayish-yellow crystals. These crystals were recovered by filtration of both the solvent layer and the aqueous layer and showed a melting point of 147° C. The yield was 30 g.

From the filtrate the solvent layer below the aqueous layer was separated and the o-hydroxy-ω-chloroacetophenone was recovered by concentrating the tetrachlorethane solution through evaporation to 30–40 ccm. and purifying the thus obtained crystals by recrystallization with alcohol (melting point 73° C.).

Example III 100 g. of a mixture of o- and p-hydroxy-ω-iodoacetophenone were treated with an equal amount of trichlorethylene and cooled under agitation to 10° C. p-hydroxy-ω-iodoacetophenone was crystallized in light yellowish crystals having a melting point of 130° C. while the o-hydroxy-ω-iodoacetophenone remained in solution. The o-compound (melting point 65° C.) was recrystallized with a little alcohol after distilling off the solvent.

Example IV 30.5 g. anisole, 56.5 g. bromoacetyl bromide and 55 g. AlCl$_3$ were heated for a period of 6 hours with 100 ccm. tetrachloroethane on a boiling water bath and then poured into 400 ccm. of water. After cooling, the crystallized p-hydroxy-ω-bromoaceto-phenone was filtered off by suction. Yield: 26.3 g.; melting point: 135° C. The filtrate is freed from the aqueous layer, the tetrachloroethane solution being then distilled off. The residue weighing 28 g. and solidifying when cooled was recrystallized from little methanol. There resulted approximately 20 g. of o-hydroxy-ω-bromoacetophenone with a melting point of 42° C.

Example V 30.5 g. anisole, 56.5 g. bromoacetylbromide and 55 g. AlCl$_3$ were heated with 100 ccm. 1,2-dichloropropane for 5½ hours on a boiling water bath and subsequently poured into 400 ccm. of water being acidified with 20 ccm. of concentrated hydrochloric acid. After cooling to about 15° C. the crystallized p-hydroxy-ω-bromoacetophenone was sucked off and dried. The yield was 26.5 g. (melting point 135° C.). The layers of the filtrate were separated by means of a separating funnel and from the lower layer the solvent was distilled off. The residue solidifying after cooling was recrystallized with 30 ccm. of methyl alcohol and after drying 19.5 g. o-hydroxy-ω-bromoacetophenone with a melting point of 42° C. were obtained.

Example VI 85 g. of a mixture of p- and o-hydroxy-ω-chloroacetophenone were heated to about 40° C. with 150 ccm. isobutyl bromide while stirring; after 15 minutes it was cooled to room temperature and the solution was sucked off from the undissolved p-product. Yield of the p-product: 45 g. (melting point 147° C.).

The mother liquor was evaporated and the residue recrystallized, using 400 ccm. petroleum ether instead of alcohol for the recrystallisation of the o-product, 31 g. are obtained (melting point 72.7° C.).

Example VII 50 g. of a mixture of p- and o-hydroxy-ω-chloroacetophenone (6:4) were dissolved in 80 g. 1,2,3,4-tetrachlorobutane under heating to about 40° C. and the clear solution was cooled to 18° C. The crystallized p-hydroxy-ω-chloroacetophenone was sucked off, washed with little tetrachlorobutane and dried. Yield 29.5 g. (melting point 147° C.). The solvent was distilled off from the mother liquor and the residue being the o-product recrystallized with 30 ccm. of methanol and dried. Yield 17 g. (melting point 73° C.).

The same yields were obtained when instead of tetrachlorobutane n-butylchloride, isopropyl bromide, 1,3-dichloropropane or a mixture of 1,2 and 2,3-dichlorobutane were used as solvents.

When using tetrachlorethylene, 1,1,1,2-tetrachloroethane, chloroform, methylene chloride, ethylene chloride and tetrachloromethane the same yields were obtained only when cooling a little e. g. to the range from +10° to +15° C.

Example VIII 60 g. of a mixture of p- and o-hydroxy-ω-iodoacetophenone were heated with 140 ccm. tert. butyl bromide to 50° C. while stirring. After cooling to about 25° C. the crystals of the p-compound were sucked off and washed with a small amount of tert. butyl bromide. 32 g. pure p-hydroxy-ω-iodoacetophenone with a melting point of 130° C. were obtained. For further purification this substance was once more dissolved in tert. butyl bromide under heating and after cooling the precipitated crystals were filtered off. The yield was 31.5 g.; the melting point was unchanged. The mother liquors were freed from the solvent by means of distillation and the residue was recrystallized with methanol, 22 g. o-hydroxy-ω-iodoacetophenone with a melting point of 65° C. being obtained.

Example IX

According to the preceding example 60 g. of a mixture of p- and o-hydroxy-ω-iodoacetophenone were treated with 140 ccm. isopropyl chloride. The yield in p-hydroxy-ω-iodoacetophenone filtered off at room temperature was 32.32 g. After distilling off the solvent and recrystallizing the residue with methanol 22 g. of the o-compound were obtained.

While the process of the invention has been described and illustrated in conjunction with certain specific examples, various changes and modifications may occur to the skilled in the art who benefit from this teaching without departing from the scope and spirit of the present invention as defined in the appended claims.

What I claim is:

1. The process of separating a halogeno methyl (p-hydroxy phenyl) ketone of the formula

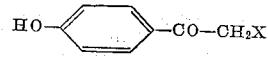

wherein X is a member selected from the group consisting of chlorine, bromine and iodine, from a mixture containing said ketone, the corresponding halogeno methyl (o-hydroxy phenyl) ketone of the formula

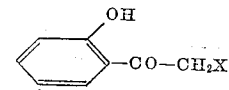

wherein X designates the same member as indicated above, and undesired impurities, comprising the steps of treating said mixture with a halogenated aliphatic hydrocarbon having 1 to 4 carbon atoms in its molecule, the halogen of said halogenated aliphatic hydrocarbon being selected from the group consisting of chlorine and bromine, and separating the undissolved halogeno methyl (p-hydroxy phenyl) ketone from the resulting solution.

2. The process according to claim 1, wherein said halogenated aliphatic hydrocarbon is a chlorinated hydrocarbon.

3. The process according to claim 1, wherein the treatment with said halogenated aliphatic hydrocarbon is effected below room temperature.

4. The process according to claim 1, wherein the halogenated aliphatic hydrocarbon is carbon tetrachloride.

5. The process according to claim 1, wherein the halogenated aliphatic hydrocarbon is tetrachloro ethane.

6. The process according to claim 1, wherein the undissolved halogeno methyl (p-hydroxy phenyl) ketone is recrystallized from said halogenated aliphatic hydrocarbon.

7. In a process of producing a halogeno methyl (p-hydroxy phenyl) ketone, the steps which comprise condensing a phenol compound selected from the group consisting of phenol and anisol with a halogeno acetyl halide in the presence of a Friedel-Crafts condensation catalyst, said phenol compound being dissolved in a halogenated aliphatic hydrocarbon having 1 to 4 carbon atoms in its molecule, the halogen of said halogenated aliphatic hydrocarbon being selected from the group consisting of chlorine and bromine, pouring the reaction mixture into water, while cooling, and separating the resulting crystallized undissolved halogeno methyl (p-hydroxy phenyl) ketone from the aqueous and solvent layers.

8. The process according to claim 7, wherein the halogenated aliphatic hydrocarbon is tetrachloro ethane.

9. The process according to claim 7, wherein the halogenated aliphatic hydrocarbon is 1,2-dichloro propane.

10. In a process of producing a halogeno methyl (p-hydroxy phenyl) ketone, the steps which comprise heating anisol dissolved in a halogenated aliphatic hydrocarbon having 1 to 4 carbon atoms in its molecule, the halogen of said halogenated aliphatic hydrocarbon being selected from the group consisting of chlorine and bromine, with a halogeno acetyl halide in the presence of a Friedel-Crafts condensation catalyst to cause Friedel-Crafts condensation, pouring the reaction mixture into water while cooling, and separating the resulting crystallized undissolved halogeno methyl (p-hydroxy phenyl) ketone from the aqueous and solvent layers.

11. The process according to claim 10, wherein the halogenated aliphatic hydrocarbon is tetrachloro ethane.

12. The process according to claim 10, wherein the halogenated aliphatic hydrocarbon is 1,2-dichloro propane.

13. In a process of producing a halogeno methyl (p-hydroxy phenyl) ketone, the steps which comprise heating anisol dissolved in a halogenated aliphatic hydrocarbon having 1 to 4 carbon atoms in its molecule, the halogen of said halogenated aliphatic hydrocarbon being selected from the group consisting of chlorine and bromine, with a halogenated acetyl halide in the presence of aluminum chloride to cause Friedel-Crafts condensation, pouring the reaction mixture into water while cooling, and separating the resulting crystallized undissolved halogeno methyl (p-hydroxy phenyl) ketone from the aqueous and solvent layers.

References Cited in the file of this patent

UNITED STATES PATENTS 2,487,777    Baddeley _____ Nov. 15, 1949

OTHER REFERENCES

Fries et al.: Ber. Deut. Chem. 43, pp. 214, 215 (1910).

Thomas: Anhydrous Aluminum Chloride in Organic Chemistry, pp. 302, 303, 358, 732 (1941).

Adams et al.: Organic Reactions, vol. I, pp. 342–356 (1942).

Groggins: Unit Processes in Organic Syntheses (4th ed.), p. 876 (1952).